United States Patent
Jung et al.

(10) Patent No.: US 11,108,074 B2
(45) Date of Patent: Aug. 31, 2021

(54) METHOD OF MANUFACTURING POUCH-SHAPED BATTERY CELL INCLUDING FIXING PROCESS USING JIG

(71) Applicant: LG CHEM, LTD., Seoul (KR)

(72) Inventors: Hye Ri Jung, Daejeon (KR); Eun Bee Kim, Daejeon (KR); Jung Pil Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 148 days.

(21) Appl. No.: 16/478,663

(22) PCT Filed: Sep. 17, 2018

(86) PCT No.: PCT/KR2018/010942
§ 371 (c)(1),
(2) Date: Jul. 17, 2019

(87) PCT Pub. No.: WO2019/054837
PCT Pub. Date: Mar. 21, 2019

(65) Prior Publication Data
US 2019/0379083 A1 Dec. 12, 2019

(30) Foreign Application Priority Data

Sep. 18, 2017 (KR) .................. 10-2017-0119803

(51) Int. Cl.
*H01M 10/04* (2006.01)
*H01M 10/0525* (2010.01)
(Continued)

(52) U.S. Cl.
CPC ............ *H01M 10/04* (2013.01); *H01M 4/04* (2013.01); *H01M 4/386* (2013.01); *H01M 4/52* (2013.01);
(Continued)

(58) Field of Classification Search
CPC .. H01M 10/04; H01M 10/0525; H01M 50/10; H01M 4/34; H01M 4/38; H01M 4/04
See application file for complete search history.

(56) References Cited

U.S. PATENT DOCUMENTS 9,263,771 B2   2/2016   Fukui et al.
9,620,809 B2   4/2017   Turon Teixidor et al.
(Continued)

FOREIGN PATENT DOCUMENTS

EP   3 579 323 A1   12/2019
JP   2001-297798 A  10/2001
(Continued)

OTHER PUBLICATIONS

Machine Translation of: KR 1020130126365, Yang, Nov. 20, 2013.*
(Continued)

*Primary Examiner* — Kenneth J Douyette
(74) *Attorney, Agent, or Firm* — Birch, Stewart, Kolasch & Birch LLP

(57) ABSTRACT

A method of manufacturing a pouch-shaped battery cell includes injecting an electrolytic solution into a pouch-shaped battery case, in which an electrode assembly is received, placing the pouch-shaped battery cell in a jig configured to fix and press the pouch-shaped battery cell and charging and discharging the pouch-shaped battery cell in the state in which pressure is applied to the jig (an activation step).

9 Claims, 1 Drawing Sheet

(51) Int. Cl.
    *H01M 4/04*     (2006.01)
    *H01M 4/38*     (2006.01)
    *H01M 4/52*     (2010.01)
    *H01M 50/10*     (2021.01)
    *H01M 50/60*     (2021.01)

(52) U.S. Cl.
    CPC ....... *H01M 10/0525* (2013.01); *H01M 50/10* (2021.01); *H01M 50/60* (2021.01)

(56) References Cited

U.S. PATENT DOCUMENTS

| | | | |
|---|---|---|---|
| 2009/0305129 A1 | 12/2009 | Fukui et al. | |
| 2014/0072868 A1* | 3/2014 | Lev ..................... | H01M 10/18 |
| | | | 429/210 |
| 2014/0266066 A1 | 9/2014 | Turon Teixidor et al. | |
| 2016/0093913 A1* | 3/2016 | Saito ................ | H01M 10/0525 |
| | | | 429/246 |
| 2016/0332531 A1* | 11/2016 | Chazal ................... | B60L 58/24 |
| 2017/0170510 A1 | 6/2017 | Turon Teixidor et al. | |
| 2019/0372062 A1 | 12/2019 | Kim et al. | |

FOREIGN PATENT DOCUMENTS

| | | |
|---|---|---|
| JP | 2016-515291 A | 5/2016 |
| KR | 10-2008-0091501 A | 10/2008 |
| KR | 10-0987942 B1 | 10/2010 |
| KR | 10-2012-0116753 A | 10/2012 |
| KR | 10-2013-0126365 A | 11/2013 |
| KR | 10-2014-0068551 A | 6/2014 |
| KR | 10-2015-0015303 A | 2/2015 |
| KR | 10-2015-0082957 A | 7/2015 |
| KR | 10-2016-0107644 A | 9/2016 |
| KR | 10-2016-0132572 A | 11/2016 |
| KR | 10-2017-0021213 A | 2/2017 |
| KR | 10-2017-0033601 A | 3/2017 |
| KR | 10-2017-0103700 A | 9/2017 |

OTHER PUBLICATIONS

International Search Report (PCT/ISA/210) issued in PCT/KR2018/010942, dated Dec. 21, 2018.
Extended European Search Report dated Apr. 29, 2020, for European Application No. 18856433.0.

* cited by examiner

【FIG. 1】
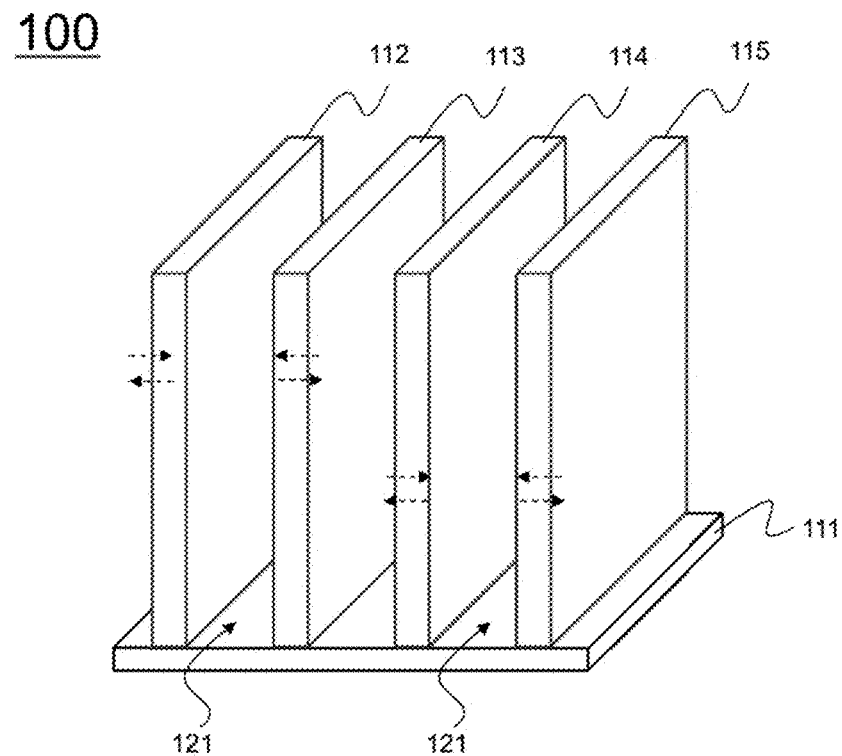
【FIG. 2】
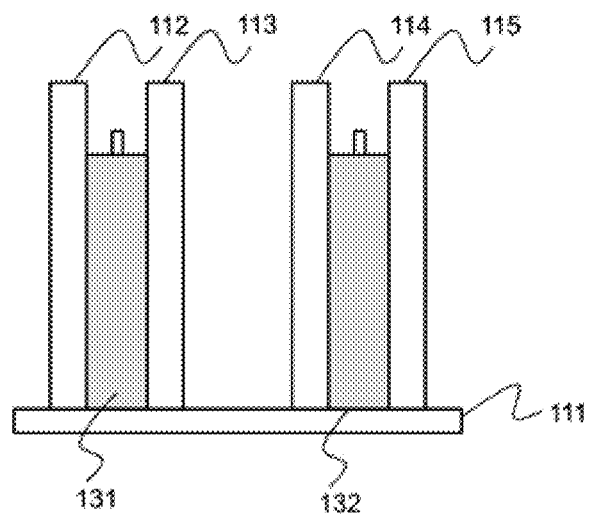

METHOD OF MANUFACTURING POUCH-SHAPED BATTERY CELL INCLUDING FIXING PROCESS USING JIG

TECHNICAL FIELD

This application claims the benefit of Korean Patent Application No. 2017-0119803 filed on Sep. 18, 2017 with the Korean Intellectual Property Office, the disclosure of which is herein incorporated by reference in its entirety.

The present invention relates to a method of manufacturing a pouch-shaped battery cell including a fixing process using a jig, and more particularly to a method of manufacturing a pouch-shaped battery cell including a process of placing the pouch-shaped battery cell in a jig configured to fix and press the pouch-shaped battery cell and an activation process of charging and discharging the pouch-shaped battery cell in the state in which pressure is applied to the jig.

BACKGROUND ART

As mobile devices have been increasingly developed and the demand for such mobile devices has increased, the demand for secondary batteries as energy sources for such mobile devices has also sharply increased. In addition, a lot of research on secondary batteries that are capable of satisfying various requirements of such mobile devices has been carried out.

Lithium secondary batteries may be classified into a cylindrical battery, a prismatic battery, and a pouch-shaped battery based on the shape of a battery case thereof. Each of the cylindrical battery and the prismatic battery is a battery that is configured to have a structure in which an electrode assembly is mounted in a metal can. The pouch-shaped battery is a battery that is generally configured to have a structure in which an electrode assembly is mounted in a pouch-shaped battery case made of an aluminum laminate sheet. Among these batteries, the pouch-shaped battery, which can be stacked with high integration, has high energy density per unit weight, is inexpensive, and can be easily modified, has attracted considerable attention in recent years.

One of the principal research goals for a pouch-shaped battery, the outer surface of which is flexible, is to improve the safety of the pouch-shaped battery. A lithium secondary battery, which is constituted by an electrode assembly, may explode due to high temperature and pressure in the secondary battery, which may be caused by an abnormal state of the secondary battery, such as a short circuit in the secondary battery, overcharge of the secondary battery with higher than an allowed current or voltage, exposure of the secondary battery to high temperatures, or deformation of the secondary battery due to being dropped or having an external impact applied thereto.

Generally, in the case in which a silicon-based negative electrode active material is used as a negative electrode active material of a secondary battery, the change in the volume of the silicon-based negative electrode active material is great and the amount of an electrolyte solution is rapidly reduced during charging and discharging of the secondary battery, whereby the cycle characteristics of the secondary battery are deteriorated compared to the case in which a graphite-based negative electrode active material is used.

In addition, when a formation process for charging and discharging a battery cell in order to activate the battery cell is performed, the battery cell is severely deformed, since the change in the volume of the silicon-based negative electrode active material is great, whereby the defect rate of the battery cell is increased.

In connection therewith, Patent Document 1 discloses a method of manufacturing a secondary battery, wherein a charging and discharging process for setting the capacity grade of the battery and a shipment charging process are performed before a degassing process for removing gas from the battery cell. However, the cited patent document does not suggest technology that is capable of increasing the rate at which an electrode assembly is impregnated with an electrolyte solution.

Patent Document 2 discloses a pressing clamp device used to prevent deformation of a battery cell during charging and discharging of the battery cell. However, the cited patent document does not disclose a method of reducing the amount of an electrolyte solution that is discharged in a process of degassing the battery cell.

Patent Document 3 discloses a method of manufacturing a battery cell including a process of pressing the outer surface of a battery case so as to induce tip pressure in an electrode assembly before a charging and discharging process for activating the battery cell in order to minimize a change in the thickness of the electrode assembly that may be caused in the activation process, thereby reducing resistance in the battery cell, and Patent Document 4 discloses a charging and discharging jig for charging and discharging a lithium polymer battery in the state in which an electrode of the lithium polymer battery is in tight contact with a current conduction member as the result of forcible support of a voltage measurement member.

However, Patent Documents 3 and 4 do not disclose a method of increasing the rate at which the electrode assembly is impregnated with an electrolyte solution.

Therefore, there is an urgent necessity for technology that is capable of increasing the rate at which an electrode assembly is impregnated with an electrolyte solution at the time of manufacture of a pouch-shaped secondary battery, thereby improving the lifespan characteristics of the battery, and that is capable of preventing deformation of a battery case, thereby reducing the defect rate of the battery.

Related Art Documents (Patent Document 1) Korean Patent Application Publication No. 2017-0033601
(Patent Document 2) Japanese Patent Application Publication No. 2016-515291
(Patent Document 3) Korean Patent Application Publication No. 2016-0132572
(Patent Document 4) Korean Registered Patent No. 0987942

DISCLOSURE

Technical Problem

The present invention has been made in view of the above problems and other technical problems that have yet to be resolved, and it is an object of the present invention to provide a method of manufacturing a pouch-shaped battery cell that is capable of performing an activation step of charging and discharging a pouch-shaped battery cell, having an electrolyte solution injected thereinto, after placing the pouch-shaped battery cell in a jig, whereby it is possible to prevent the pouch-shaped battery cell from being deformed in the activation process for charging and discharging the pouch-shaped battery cell and to increase the rate at which an electrode assembly is impregnated with the electrolyte solution, and therefore it is possible to provide a pouch-shaped battery cell having high capacity and improved lifespan characteristics.

Technical Solution

In accordance with an aspect of the present invention, the above and other objects can be accomplished by the provision of a method of manufacturing a pouch-shaped battery cell, the method including injecting an electrolytic solution into a pouch-shaped battery case, in which an electrode assembly is received, placing the pouch-shaped battery cell in a jig configured to fix and press the pouch-shaped battery cell; and an activation step including charging and discharging the pouch-shaped battery cell while pressure is applied to the pouch-shaped battery cell by the jig.

That is, the method of manufacturing the pouch-shaped battery cell according to the present invention includes a process of charging and discharging a pouch-shaped battery cell having an electrolytic solution injected thereinto while applying pressure to the pouch-shaped battery cell in the state in which the pouch-shaped battery cell is fixed by a jig.

In general, at the time of charging and discharging the pouch-shaped battery cell, the battery case may swell or distort due to expansion of the electrode assembly or the generation of gas in the pouch-shaped battery cell. In the case in which the pouch-shaped battery cell is charged and discharged in the state of being placed in the jig, as in the present invention, it is possible to prevent deformation of the battery cell and thus to prevent an increase in the defect rate of the battery cell due to deterioration in the external appearance of the battery cell.

Also, in the case of a high-capacity battery, an electrolytic solution is discharged from the battery during a degassing process, whereby the remaining amount of the electrolytic solution is reduced, which may reduce the lifespan of the battery. In the case in which the pouch-shaped battery cell is charged in the state of being placed in the jig, as in the present invention, the electrolytic solution is introduced into pores formed in the expanded electrode, whereby the amount of the electrolytic solution that is impregnated is increased, and therefore it is possible to reduce the amount of the electrolytic solution that is discharged during a degassing process. Consequently, it is possible to solve a problem in which the cycle characteristics of the battery cell are deteriorated due to an insufficient remaining amount of the electrolytic solution.

In a concrete example, the electrode assembly may include a negative electrode including a silicon-based negative electrode active material. For example, the silicon-based negative electrode active material may be at least one selected from the group consisting of SiC, SiO, SiM, and a combination thereof, wherein M may include any one selected from the group consisting of Ni, Co, B, Cr, Cu, Fe, Mn, Ti, Y, and a combination thereof.

In general, carbon, a lithium transition metal oxide, or a silicon-based compound may be used as a negative electrode active material of a secondary battery. In the case in which the silicon-based compound is used as the negative electrode active material, silicon particles may electrochemically adsorb, store, and discharge lithium atoms, whereby the crystalline structure of the silicon particles may be changed. As the silicon particles adsorb, store, and discharge the lithium atoms, the composition and the crystalline structure of the silicon particles are changed into Si (crystalline structure: Fd3m), LiSi (crystalline structure: I41/a), $Li_2Si$ (crystalline structure: C2/m), $Li_7Si_2$ (Pbam), or $Li_{22}Si_5$ (F23). As the crystalline structure of the silicon particles is changed, as described above, the volume of the silicon particles becomes about 4 times as much as the volume of the silicon particles before lithium is introduced thereinto. As the number of pores formed between the expanded silicon particles is increased, the amount of the electrolytic solution that is impregnated is increased.

In the case in which a silicon-based compound including silicon is used as the negative electrode active material, as described above, the amount of the electrolytic solution that is impregnated may be increased. In the case in which the electrolytic solution is prevented from being easily discharged to the outside, therefore, it is possible to improve the lifespan characteristics of the battery cell.

The jig may be configured to have a structure capable of receiving a plurality of pouch-shaped battery cells. Specifically, the jig may be configured to have a structure in which a plurality of support members is provided in order to fix the pouch-shaped battery cells in the vertical direction such that electrode terminals of the pouch-shaped battery cells protrude upwards.

In a concrete example, the method may further include a degassing step of discharging gas from the pouch-shaped battery cell after the activation step. The degassing process may be performed using a method of performing vacuum suctioning and applying pressure in order to remove gas generated in the battery cell at the formation step. Since the electrolytic solution as well as the gas is discharged to the outside, however, the degassing process must be carefully performed for a high-capacity battery that requires an excessive amount of electrolytic solution.

In the case in which the degassing step is performed after the activation step, gas is discharged from the battery cell after the remaining amount of the electrolytic solution in the expanded negative electrode active material is increased. Consequently, it is possible to reduce the amount of electrolytic solution that is discharged in the degassing process.

The electrolytic solution may be injected using a general injection method or a vacuum injection method. In the general injection method, a predetermined amount of an electrolytic solution is injected into a pouch-shaped battery case using a pipette in the state in which a pouch-shaped battery cell is erected vertically, and then a wetting process is performed in a vacuum atmosphere for about 3 to 5 minutes.

The vacuum injection method is performed as follows.

A pouch-shaped battery cell is placed in a vacuum injection chamber in the state in which plates are disposed at opposite surfaces of the pouch-shaped battery cell, and then the interior of the chamber is maintained in a vacuum state for 1 minute in the state in which an electrolytic solution injection nozzle is inserted into the pouch-shaped battery cell. A vacuum breakage valve is opened in order to adjust the extent of vacuum in the chamber to a desired level, and then an electrolytic solution injection valve is opened to inject an electrolytic solution into the pouch-shaped battery cell. After the injection of the electrolytic solution, the vacuum breakage valve is opened in order to break the vacuum for 5 seconds, while the surface of the electrolytic solution is maintained for about 1 to 5 minutes in order to improve wetting efficiency, and then the pouch-shaped battery cell is removed from the chamber.

Preferably, therefore, the vacuum injection method is used in order to achieve uniform efficiency in impregnating the electrode assembly with the electrolytic solution.

The method according to the present invention may further include a process of aging the pouch-shaped battery cell before and after the activation step. The aging process may be a process for maintaining the state of the battery cell uniform or slowly changing the state of the battery cell in order to age the battery cell.

The aging process may include a normal-temperature aging process and a high-temperature aging process. The normal-temperature aging process may be performed at a temperature of 18° C. to 27° C., and the high-temperature aging process may be performed at a temperature of higher than 50° C. to 70° C.

Specifically, the electrolytic solution is injected before the activation step. In order to sufficiently impregnate the electrode assembly with the electrolytic solution, the pouch-shaped battery cell may be aged at ambient temperature for about 3 days. After the activation step, the pouch-shaped battery cell may be aged at ambient temperature for about 1 day in order to stabilize the pouch-shaped battery cell after the pouch-shaped battery cell is charged and discharged.

In a concrete example, the activation step may be performed such that the pouch-shaped battery cell has an SOC of 50% to 100%. In the case in which the SOC is less than 50%, the remaining amount of the electrolytic solution is reduced and the lifespan characteristics of the pouch-shaped battery cell are deteriorated, which is undesirable.

In accordance with another aspect of the present invention, there is provided a pouch-shaped battery cell manufactured using the method of manufacturing the pouch-shaped battery cell.

A secondary battery according to the present invention may be a lithium secondary battery configured to have a structure in which an electrode assembly, in which a separator is interposed between a positive electrode and a negative electrode, is impregnated with a non-aqueous electrolytic solution containing lithium salt.

The positive electrode is manufactured, for example, by applying a positive electrode mixture including a positive electrode active material to a positive electrode current collector and drying the positive electrode mixture. The positive electrode mixture may further selectively include a binder, a conductive agent, and a filler as needed.

The positive electrode current collector is generally manufactured so as to have a thickness of 3 to 500 μm. The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or plastic carbon. Alternatively, the positive electrode current collector may be made of aluminum or stainless steel, the surface of which is treated with carbon, nickel, titanium, or silver. In addition, the positive electrode current collector may have a micro-scale uneven pattern formed on the surface thereof so as to increase the force of adhesion of the positive electrode active material. The positive electrode current collector may be configured in various forms, such as those of a film, a sheet, a foil, a net, a porous body, a foam body, and a non-woven fabric body.

The positive electrode active material is a material that is capable of inducing an electrochemical reaction. The positive electrode active material may be a lithium transition metal oxide including two or more transition metals. For example, the positive electrode active material may be, but is not limited to, a layered compound, such as a lithium cobalt oxide ($LiCoO_2$) or a lithium nickel oxide ($LiNiO_2$) substituted with one or more transition metals; a lithium manganese oxide substituted with one or more transition metals; a lithium nickel-based oxide represented by the chemical formula $LiNi_{1-y}M_yO_2$ (where M=Co, Mn, Al, Cu, Fe, Mg, B, Cr, Zn, or Ga, at least one of which is included, and $0.01 \leq y \leq 0.7$); a lithium nickel cobalt manganese composite oxide represented by the chemical formula $Li_{1+z}Ni_bMn_cCo_{1-(b+c+d)}M_dO_{(2-e)}A_e$ (where $-0.5 \leq z \leq 0.5$, $0.1 \leq b \leq 0.8$, $0.1 \leq c \leq 0.8$, $0 \leq d \leq 0.2$, $0 \leq e \leq 0.2$, b+c+d<1, M=Al, Mg, Cr, Ti, Si, or Y, and A=F, P, or Cl), such as $Li_{1+z}Ni_{1/3}Co_{1/3}Mn_{1/3}O_2$ or $Li_{1+z}Ni_{0.4}Mn_{0.4}Co_{0.2}O_2$; or olivine-based lithium metal phosphate represented by the chemical formula $Li_{1+x}M_{1-y}M'_yPO_{4-z}X_z$ (where M=a transition metal, preferably Fe, Mn, Co, or Ni, M'=Al, Mg, or Ti, X=F, S, or N, $-0.5 \leq x \leq 0.5$, $0 \leq y \leq 0.5$, and $0 \leq z \leq 0.1$).

The conductive agent is generally added so that the conductive agent is present in an amount of 1 to 30 weight % based on the total weight of the compound including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or conductive materials, such as polyphenylene derivatives, may be used as the conductive agent.

The binder is a component assisting in binding between the active material and the conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the electrode. There is no particular limit to the filler, as long as the filler is made of a fibrous material while the filler does not cause chemical changes in a battery to which the filler is applied. As examples of the filler, there may be used olefin-based polymers, such as polyethylene and polypropylene; and fibrous materials, such as glass fiber and carbon fiber.

The negative electrode may be manufactured, for example, by applying a negative electrode mixture including a negative electrode active material to a negative electrode current collector and drying the negative electrode mixture. The negative electrode mixture may include the above-described components, such as a conductive agent, a binder, and a filler, as needed.

In general, the negative electrode current collector is manufactured so as to have a thickness of 3 to 500 μm. The negative electrode current collector is not particularly restricted, as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase the force of adhesion of the negative electrode active material, in the same manner as the positive electrode current collector. The negative electrode current collector may be configured in various forms, such as those of a film, a sheet, a foil, a net, a porous body, a foam body, and a non-woven fabric body.

As the negative electrode active material, for example, there may be used carbon, such as a hard carbon or a graphite-based carbon; a metal composite oxide, such as $Li_xFe_2O_3$ ($0 \le x \le 1$), $Li_xWO_2$ ($0 \le x \le 1$), or $Sn_xMe_{1-x}Me'_yO_z$ (Me: Mn, Fe, Pb, Ge; Me': Al, B, P, Si, Group 1, 2 and 3 elements of the periodic table, halogen; $0 < x \le 1$; $1 \le y \le 3$; $1 \le z \le 8$); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

The binder, the conductive agent, and other components added as needed are identical to those described in connection with the positive electrode.

Depending on the circumstances, a filler may be selectively added as a component used to inhibit expansion of the negative electrode. There is no particular limit to the filler as long as the filler is made of a fibrous material while the filler does not cause chemical changes in a battery to which the filler is applied. As examples of the filler, there may be used olefin polymers, such as polyethylene and polypropylene; and fibrous materials, such as glass fiber and carbon fiber.

In addition, other components, such as a viscosity-controlling agent and an adhesion promoter, may selectively be further included, either alone or as a combination of two or more components.

The viscosity-controlling agent is a component for controlling the viscosity of the electrode mixture so as to facilitate mixing of the electrode mixture and coating thereof on the current collector. The viscosity-controlling agent may be added in an amount of up to 30 weight % based on the total weight of the negative electrode mixture. Examples of the viscosity-controlling agent include, without being limited to, carboxymethylcellulose and polyvinylidene fluoride. However, the present invention is not limited thereto. Depending on the circumstances, the above-described solvent may also function as the viscosity-controlling agent.

The adhesion promoter is an auxiliary component that is added to improve adhesion between the electrode active material and the electrode current collector. The adhesion promoter may be added in an amount of 10 weight % or less based on the amount of the binder. Examples of the adhesion promoter include, without being limited to, oxalic acid, adipic acid, formic acid, acrylic acid derivatives, and itaconic acid derivatives.

The separator is interposed between the positive electrode and the negative electrode. As the separator, for example, an insulative thin film that exhibits high ion permeability and mechanical strength is used. The separator generally has a pore diameter of 0.01 to 10 μm and a thickness of 5 to 300 μm. As the material for the separator, for example, a sheet or non-woven fabric made of olefin polymer, such as polypropylene, which exhibits chemical resistance and hydrophobicity, glass fiber, or polyethylene is used. In the case in which a solid electrolyte, such as a polymer, is used as an electrolyte, the solid electrolyte may also function as the separator.

The non-aqueous electrolytic solution containing lithium salt is composed of an electrolytic solution and lithium salt. A non-aqueous organic solvent, an organic solid electrolyte, or an inorganic solid electrolyte may be used as the electrolytic solution.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulfides of lithium (Li), such as $Li_3N$, LiI, $LisNI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte, and may include, for example, LiCl, LiBr, LiI, $LiC_{10}O_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. Depending on the circumstances, in order to impart incombustibility thereto, the non-aqueous electrolytic solution may further include halogen-containing solvents, such as carbon tetrachloride and ethylene trifluoride. Furthermore, in order to improve high-temperature retention characteristics thereof, the non-aqueous electrolytic solution may further include carbon dioxide gas. Moreover, fluoro-ethylene carbonate (FEC) and propene sultone (PRS) may be further included.

In a preferred example, lithium salt, such as $LiPF_6$, $LiCO_4$, $LiBF_4$, or $LiN(SO_2CF_3)_2$, may be added to a mixed solvent of cyclic carbonate, such as EC or PC, which is a high-dielectric solvent, and linear carbonate, such as DEC, DMC, or EMC, which is a low-viscosity solvent, in order to manufacture a non-aqueous electrolyte containing lithium salt.

The amount of the electrolytic solution per unit capacity remaining in the pouch-shaped battery cell may range from 2.14 g/Ah to 2.25 g/Ah.

Specifically, pouch-shaped battery cells were charged so as to have the same SOC value and were then charged and discharged 200 times in order to compare the amount of the electrolytic solution per unit capacity remaining in one of the pouch-shaped battery cells at the time of activating the pouch-shaped battery cell in the state in which the pouch-shaped battery cell is located in the jig with the amount of the electrolytic solution per unit capacity remaining in the other pouch-shaped battery cell at the time of activating the pouch-shaped battery cell in the state in which the pouch-shaped battery cell is not located in the jig. The result of comparison revealed that the amount of the electrolytic solution per unit capacity remaining in the pouch-shaped battery cell was increased within a range of 2.14 g/Ah to 2.25 g/Ah as the SOC value was increased. This means that the amount of the electrolytic solution per unit capacity remaining in the pouch-shaped battery cell in the case in which the pouch-shaped battery cell is charged so as to have a specific SOC value in the state of being fixed by the jig is larger than the amount of the electrolytic solution per unit capacity remaining in the pouch-shaped battery cell in the case in which the pouch-shaped battery cell is charged so as to have the same SOC value in the state of not being fixed by the jig.

BRIEF DESCRIPTION OF DRAWINGS

FIG. 1 is a perspective view showing a jig for fixing a pouch-shaped battery cell.

FIG. 2 is a front view showing the state in which pouch-shaped battery cells are fixed by the jig of FIG. 1.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to parts that perform similar functions or operations. Meanwhile, in the case in which one part is 'connected' to another part in the following description of the present invention, not only may the one part be directly connected to the another part, but also, the one part may be indirectly connected to the another part via a further part. In addition, that a certain element is 'included' means that other elements are not excluded, but may be further included unless mentioned otherwise.

Reference will now be made in detail to the preferred embodiments of the present invention, examples of which are illustrated in the accompanying drawings.

FIG. 1 is a perspective view schematically showing a jig for fixing a pouch-shaped battery cell according to the present invention.

Referring to FIG. 1, the jig, denoted by reference numeral 100, includes a flat type base 111, on the upper surface of which a pouch-shaped battery cell is located, support portions 112, 113, 114, and 115 fixed to the base 111 so as to extend perpendicularly from the base 111 in order to fix a pouch-shaped battery cell, and pouch-shaped battery cell reception portions 121, in each of which a pouch-shaped battery cell is located.

The jig 100 is configured to have a structure including four support portions 112, 113, 114, and 115. The support portion 112 and the support portion 113 make a pair, and the support portion 114 and the support portion 115 make another pair. Each pair of the support portions 112 and 113 and the support portions 114 and 115 move toward each other to press a pouch-shaped battery cell located in a corresponding one of the battery cell reception portions 121. In order to remove a pouch-shaped battery cell that has undergone a pressing process and a formation process, each pair of the support portions 112 and 113 and the support portions 114 and 115 move away from each other.

The jig 100 is configured to have a structure including four support portions. However, the number of support portions of the jig used in the manufacturing method according to the present invention is not particularly restricted. A jig configured to have a structure in which two or more support portions are provided in order to press a pouch-shaped battery cell located therebetween may fall within the scope of the present invention.

FIG. 2 is a front view schematically showing the state in which pouch-shaped battery cells are fixed by the jig of FIG. 1.

Referring to FIG. 2, a pouch-shaped battery cell 131 is fixed between the support portion 112 and the support portion 113, and another pouch-shaped battery cell 132 is fixed between the support portion 114 and the support portion 115.

In the case in which the size of each of the support portions 112, 113, 114, and 115 is set so as to be greater than the size of a corresponding one of the pouch-shaped battery cells 131 and 132, pressure may be uniformly applied to the pouch-shaped battery cells. Consequently, the height and width of each of the support portions 112, 113, 114, and 115 are set so as to be greater than the height and width of a corresponding one of the pouch-shaped battery cells 131 and 132. As shown in the figure, the support portions 112, 113, 114, and 115 are configured to press two pouch-shaped battery cells. Alternatively, the jig may be configured to have a structure including a plurality of support portions and a plurality of battery cell reception portions 121 in order to press one pouch-shaped battery cell or to simultaneously press two or more pouch-shaped battery cells.

Each of the pouch-shaped battery cells 131 and 132 is fixed in a corresponding one of the battery cell reception portions 121 in the state of being erected in the vertical direction such that electrode terminals thereof protrude upwards. Alternatively, the electrode terminals may protrude laterally from the pouch-shaped battery cell, as long as the pouch-shaped battery cell is erected in the vertical direction.

In the case in which the magnitude of pressure that is applied to pouch-shaped battery cells is set in the state in which the pouch-shaped battery cells are located in the jig 100, the support portions move toward each other to press the pouch-shaped battery cells. In this state, the pouch-shaped battery cells are charged and discharged.

Hereinafter, the present invention will be described with reference to the following examples. These examples are provided only for easier understanding of the present invention and should not be construed as limiting the scope of the present invention.

Example 1

An electrode assembly, configured to have a structure in which a positive electrode including lithium cobalt oxide, as a positive electrode active material, and a negative electrode including silicon oxide, as a negative electrode active material, were stacked in the state in which a separator was interposed between the positive electrode and the negative electrode, was placed in a pouch-shaped battery case, and an electrolytic solution was injected into the pouch-shaped battery case in order to manufacture a pouch-shaped battery cell.

The pouch-shaped battery cell was aged at ambient temperature for 3 days, and then the pouch-shaped battery cell was fixed by a jig including a battery cell reception portion. In this state, the pouch-shaped battery cell was charged at a charge rate of 0.2 C, was discharged at a discharge rate of 0.2 C, and was then charged again at a charge rate of 0.2 C so as to have an SOC of 30%.

After being charged and discharged, the pouch-shaped battery cell was aged at ambient temperature for 1 day, and then a degassing process was performed in order to remove gas from the pouch-shaped battery cell after activation. At this time, unnecessary excess electrolytic solution in the pouch-shaped battery cell was also discharged from the pouch-shaped battery cell.

Subsequently, the capacity of the battery cell, the thickness of the battery cell, the remaining amount of the electrolytic solution, and the capacity retention rate of the battery cell after being charged and discharged 200 times were measured. The results are shown in Table 1.

Example 2

A pouch-shaped battery cell was manufactured in the same manner as in Example 1 except that, in an activation process, the pouch-shaped battery cell was charged at a charge rate of 0.2 C, was discharged at a discharge rate of 0.2 C, and was then charged again at a charge rate of 0.2 C so as to have an SOC of 50% in the state in which the pouch-shaped battery cell was fixed by the jig. After being charged and discharged, the pouch-shaped battery cell was aged at ambient temperature for 1 day, and then a degassing process was performed in order to remove gas from the pouch-shaped battery cell after activation. At this time, unnecessary excess electrolytic solution in the pouch-shaped battery cell was also discharged from the pouch-shaped battery cell.

Subsequently, the capacity of the battery cell, the thickness of the battery cell, the remaining amount of the electrolytic solution, and the capacity retention rate of the battery cell after being charged and discharged 200 times were measured. The results are shown in Table 1.

Example 3

A pouch-shaped battery cell was manufactured in the same manner as in Example 1 except that, in an activation process, the pouch-shaped battery cell was charged at a charge rate of 0.2 C, was discharged at a discharge rate of 0.2 C, and was then charged again at a charge rate of 0.2 C so as to have an SOC of 70% in the state in which the pouch-shaped battery cell was fixed by the jig. After being charged and discharged, the pouch-shaped battery cell was aged at ambient temperature for 1 day, and then a degassing process was performed in order to remove gas from the pouch-shaped battery cell after activation. At this time, unnecessary excess electrolytic solution in the pouch-shaped battery cell was also discharged from the pouch-shaped battery cell.

Subsequently, the capacity of the battery cell, the thickness of the battery cell, the remaining amount of the electrolytic solution, and the capacity retention rate of the battery cell after being charged and discharged 200 times were measured. The results are shown in Table 1.

Example 4

A pouch-shaped battery cell was manufactured in the same manner as in Example 1 except that, in an activation process, the pouch-shaped battery cell was charged at a charge rate of 0.2 C, was discharged at a discharge rate of 0.2 C, and was then charged again at a charge rate of 0.2 C so as to have an SOC of 100% in the state in which the pouch-shaped battery cell was fixed by the jig. After being charged and discharged, the pouch-shaped battery cell was aged at ambient temperature for 1 day, and then a degassing process was performed in order to remove gas from the pouch-shaped battery cell after activation. At this time, unnecessary excess electrolytic solution in the pouch-shaped battery cell was also discharged from the pouch-shaped battery cell.

Subsequently, the capacity of the battery cell, the thickness of the battery cell, the remaining amount of the electrolytic solution, and the capacity retention rate of the battery cell after being charged and discharged 200 times were measured. The results are shown in Table 1.

Comparative Example 1

A pouch-shaped battery cell was manufactured in the same manner as in Example 1 except that an activation process was performed in the state in which the pouch-shaped battery cell was not fixed by the jig. After being charged and discharged, the pouch-shaped battery cell was aged at ambient temperature for 1 day, and then a degassing process was performed in order to remove gas from the pouch-shaped battery cell after activation. At this time, unnecessary excess electrolytic solution in the pouch-shaped battery cell was also discharged from the pouch-shaped battery cell.

Subsequently, the capacity of the battery cell, the thickness of the battery cell, the remaining amount of the electrolytic solution, and the capacity retention rate of the battery cell after being charged and discharged 200 times were measured. The results are shown in Table 1.

Comparative Example 2

A pouch-shaped battery cell was manufactured in the same manner as in Example 2 except that an activation process was performed in the state in which the battery cell was not fixed by the jig. After being charged and discharged, the pouch-shaped battery cell was aged at ambient temperature for 1 day, and then a degassing process was performed in order to remove gas from the pouch-shaped battery cell after activation. At this time, unnecessary excess electrolytic solution in the pouch-shaped battery cell was also discharged from the pouch-shaped battery cell.

Subsequently, the capacity of the battery cell, the thickness of the battery cell, the remaining amount of the electrolytic solution, and the capacity retention rate of the battery cell after being charged and discharged 200 times were measured. The results are shown in Table 1.

Comparative Example 3

A pouch-shaped battery cell was manufactured in the same manner as in Example 3 except that an activation process was performed in the state in which the battery cell was not fixed by the jig. After being charged and discharged, the pouch-shaped battery cell was aged at ambient temperature for 1 day, and then a degassing process was performed in order to remove gas from the pouch-shaped battery cell after activation. At this time, unnecessary excess electrolytic solution in the pouch-shaped battery cell was also discharged from the pouch-shaped battery cell.

Subsequently, the capacity of the battery cell, the thickness of the battery cell, the remaining amount of the electrolytic solution, and the capacity retention rate of the battery cell after being charged and discharged 200 times were measured. The results are shown in Table 1.

Comparative Example 4

A pouch-shaped battery cell was manufactured in the same manner as in Example 4 except that an activation process was performed in the state in which the battery cell was not fixed by the jig. After being charged and discharged, the pouch-shaped battery cell was aged at ambient temperature for 1 day, and then a degassing process was performed in order to remove gas from the pouch-shaped battery cell after activation. At this time, unnecessary excess electrolytic solution in the pouch-shaped battery cell was also discharged from the pouch-shaped battery cell.

Subsequently, the capacity of the battery cell, the thickness of the battery cell, the remaining amount of the electrolytic solution, and the capacity retention rate of the battery cell after being charged and discharged 200 times were measured. The results are shown in Table 1.

TABLE 1

|  | Capacity of battery cell (0.2 C, mAh) | Remaining amount of electrolytic solution per unit capacity (g/Ah) | Thickness of battery cell (mm) | Capacity retention rate (0.8 c/0.5 c, 25° C.) |
|---|---|---|---|---|
| Example 1 | 3,403 | 2.14 | 4.430 | 84%, 200 cycles |
| Example 2 | 3,415 | 2.17 | 4.454 | 89%, 200 cycles |
| Example 3 | 3,423 | 2.21 | 4.578 | 92%, 200 cycles |
| Example 4 | 3,430 | 2.25 | 4.589 | 94%, 200 cycles |
| Comparative Example 1 | 3,403 | 2.08 | 4.650 | 80%, 200 cycles |
| Comparative Example 2 | 3,396 | 2.12 | 4.702 | 82%, 200 cycles |
| Comparative Example 3 | 3,390 | 2.14 | 4.750 | 83%, 200 cycles |
| Comparative Example 4 | 3,382 | 2.17 | 4.780 | 86%, 200 cycles |

Referring to Table 1 above, the capacities of the battery cells manufactured according to Examples 1 to 4, measured after the activation process was performed using the jig, were 3,403 mAh, 3,415 mAh, 3,423 mAh, and 3,430 mAh, respectively. The battery cell manufactured according to Comparative Example 1 had the same capacity as the battery cell manufactured according to Example 1, but the capacities of the battery cells manufactured according to Examples 2 to 4 were 19 mAh, 33 mAh, and 48 mAh greater than the capacities of the battery cells manufactured according to Comparative Examples 2 to 4, respectively. In addition, when comparing the remaining amount of the electrolytic solution per unit capacity in the case in which the pouch-shaped battery cells manufactured according to Examples and Comparative Examples were charged so as to have the same SOC values, the remaining amount of the electrolytic solution per unit capacity in each of the battery cells manufactured according to Examples was 0.05 g/Ah to 0.08 g/Ah larger than the remaining amount of the electrolytic solution per unit capacity in a corresponding one of the battery cells manufactured according to Comparative Examples.

In addition, as the result of measuring the thickness of each of the battery cells after the activation process was performed, the thickness of each of the battery cells manufactured-according to Examples 1 to 4 was smaller than the thickness of a corresponding one of the battery cells manufactured according to Comparative Examples 1 to 4, charged so as to have the same SOC values, and the capacity retention rate of each of the battery cells manufactured according to Examples 1 to 4 after being charged and discharged 200 cycles was higher than the capacity retention rate of a corresponding one of the battery cells manufactured according to Comparative Examples 1 to 4 after being charged and discharged 200 cycles.

In the case in which the battery cell is charged and discharged using the jig according to the manufacturing method of the present invention, therefore, the battery cell is only slightly deformed, the capacity of the battery cell is increased, and the amount of the electrolytic solution remaining in the battery cell is increased. Consequently, it is possible to provide a battery cell having improved lifespan characteristics.

Those skilled in the art to which the present invention pertains will appreciate that various applications and modifications are possible based on the above description without departing from the scope of the present invention.

DESCRIPTION OF REFERENCE NUMERALS

100: Jig
111: Base of jig
112, 113, 114, 115: Support portions of jig
121: Battery cell reception portions of jig
131, 132: Pouch-shaped battery cells

INDUSTRIAL APPLICABILITY

As is apparent from the above description, in a method of manufacturing a pouch-shaped battery cell according to the present invention, a pouch-shaped battery cell having an electrode assembly and an electrolyte solution received therein is placed in a jig, and an activation process of charging the pouch-shaped battery cell is performed in the state in which pressure is applied to the jig. In this case, the battery cell is pressed by the jig, and therefore it is possible to prevent the battery cell from being deformed due to expansion of the electrode assembly while the battery cell is charged and discharged.

In addition, since the battery cell is charged in the state of being placed in the jig, the electrolytic solution is introduced into pores formed in an expanded negative electrode, whereby the amount of the electrolytic solution that is impregnated is increased. As a result, the amount of the electrolytic solution that is discharged in a degassing process is reduced, whereby it is possible to improve the lifespan characteristics of the battery cell.

The invention claimed is:

1. A method of manufacturing a pouch-shaped battery cell, the method comprising:

injecting an electrolytic solution into a pouch-shaped battery case, in which an electrode assembly is received;

placing the pouch-shaped battery cell in a jig configured to fix and press the pouch-shaped battery cell; and an activation step including charging and discharging the pouch-shaped battery cell while pressure is applied to the pouch-shaped battery cell by the jig such that the pouch-shaped battery cell has a state of charge (SOC) of 50% to 100%.

2. The method according to claim 1, wherein the electrode assembly comprises a negative electrode comprising a silicon-based negative electrode active material.

3. The method according to claim 2, wherein the silicon-based negative electrode active material is at least one selected from a group consisting of SiC, SiO, SiM, and a combination thereof, and wherein M comprises any one selected from a group consisting of Ni, Co, B, Cr, Cu, Fe, Mn, Ti, Y, and a combination thereof.

4. The method according to claim 1, wherein the jig is configured to have a structure capable of receiving a plurality of pouch-shaped battery cells.

5. The method according to claim 1, further comprising discharging gas from the pouch-shaped battery cell after the activation step.

6. The method according to claim 1, wherein the electrolytic solution is injected using a vacuum injection method.

7. The method according to claim 1, further comprising aging the pouch-shaped battery cell before and after the activation step.

8. A pouch-shaped battery cell manufactured using the method of manufacturing the pouch-shaped battery cell according to claim 1.

9. The pouch-shaped battery cell according to claim 8, wherein an amount of the electrolytic solution per unit capacity remaining in the pouch-shaped battery cell ranges from 2.14 g/Ah to 2.25 g/Ah.

* * * * *